(12) United States Patent
Chang et al.

(10) Patent No.: US 7,112,232 B2
(45) Date of Patent: Sep. 26, 2006

(54) AIR CLEANING APPARATUS

(75) Inventors: Jun Eui Chang, Suwon (KR); In A Chae, Seoul (KR); Jin Soon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/673,129

(22) Filed: Sep. 30, 2003

(65) Prior Publication Data

US 2004/0118093 A1 Jun. 24, 2004

(30) Foreign Application Priority Data

Dec. 23, 2002 (KR) .................. 10-2002-0082705

(51) Int. Cl.
*B01D 46/00* (2006.01)

(52) U.S. Cl. .............. 55/481; 55/385.1; 55/385.6; 55/486; 55/487; 55/472; 55/473; 55/467; 55/506; 55/493; 454/187

(58) Field of Classification Search .......... 55/385.1, 55/385.6, 486, 487, 472, 467, 473, 505, 493, 55/525, 481, 506; 454/187
See application file for complete search history.

(56) References Cited

U.S. PATENT DOCUMENTS

| 4,248,162 | A |   | 2/1981 | Skeist |   |
|---|---|---|---|---|---|
| 4,268,282 | A | * | 5/1981 | MacKenzie | ............... 96/58 |
| 4,773,922 | A | * | 9/1988 | Ross et al. | ............... 55/481 |
| 4,900,344 | A | * | 2/1990 | Lansing | ............... 55/322 |
| 5,230,720 | A |   | 7/1993 | Kendall |   |
| 5,435,837 | A | * | 7/1995 | Lewis et al. | ............... 96/54 |

(Continued)

FOREIGN PATENT DOCUMENTS

EP 08182541 7/1996

(Continued)

OTHER PUBLICATIONS

Communication including European Search Report from the European Patent Office dated Apr. 23, 2004 for the corresponding European patent application.

*Primary Examiner*—Duane Smith
*Assistant Examiner*—Minh-Chau T. Pham
(74) *Attorney, Agent, or Firm*—Staas & Halsey LLP

(57) ABSTRACT

An air cleaning apparatus includes a blowing unit and a filtering unit which are easily removed from and installed in a cabinet, allowing the air cleaning apparatus to be easily cleaned. The cabinet included in the air cleaning apparatus may be used as a table. The cabinet is provided with a top panel of a predetermined area, is opened at a bottom thereof, and is provided on at least one side wall thereof with an air outlet port. A fan casing is installed in the cabinet to be drawn out from the cabinet in a horizontal direction. A blowing fan is installed in the fan casing to move air to the air outlet port. A filter casing is installed under the fan casing to be drawn out from the cabinet in the horizontal direction, and at least one filter is installed in the filter casing.

32 Claims, 7 Drawing Sheets

U.S. PATENT DOCUMENTS

| | | | |
|---|---|---|---|
| 5,525,136 A * | 6/1996 | Rosen | 55/486 |
| 5,730,770 A * | 3/1998 | Greisz | 55/385.6 |
| 5,904,755 A | 5/1999 | Kanazashi et al. | |
| 5,984,990 A * | 11/1999 | McDonald | 55/385.1 |
| 6,036,736 A * | 3/2000 | Wallace et al. | 55/385.2 |
| 6,050,774 A | 4/2000 | Le Baron | |
| 6,319,116 B1 * | 11/2001 | Behl | 454/187 |
| 2004/0118285 A1 * | 6/2004 | Kim et al. | 96/55 |
| 2006/0016163 A1 * | 1/2006 | O'Connor et al. | 55/481 |

FOREIGN PATENT DOCUMENTS

| | | |
|---|---|---|
| EP | 11290137 | 10/1999 |
| EP | 0 831 279 A1 | 3/2003 |

\* cited by examiner

AIR CLEANING APPARATUS

CROSS-REFERENCE TO RELATED APPLICATIONS

This application claims the benefit of Korean Application No. 2002-82705, filed Dec. 23, 2002, in the Korean Intellectual Property Office, the disclosure of which is incorporated herein by reference.

BACKGROUND OF THE INVENTION

1. Field of the Invention

The present invention relates, in general, to air cleaning apparatuses and, more particularly, to an air cleaning apparatus, which allows a blowing unit and a filtering unit to be easily cleaned, and which may also be used as a table.

2. Description of the Related Art

As is well known to those skilled in the art, an air cleaning apparatus is an appliance which removes dust or bacteria from air to clean the air. The air cleaning apparatus is provided with a blowing unit and a filtering unit. The blowing unit functions to suck room air and forcibly circulate the air. The filtering unit functions to remove the dust or bacteria from the air which is circulated by the blowing unit.

The air cleaning apparatus includes a cabinet which defines an external appearance of the air cleaning apparatus. The blowing unit includes a blowing fan provided in the cabinet, and a motor to drive the blowing fan. The filtering unit is provided at an air inlet side or an air outlet side of the blowing unit, and includes a free filter of a net structure with relatively large meshes, an electrostatic dust filter, a fine dust filter which is made of polypropylene resin or polyethylene resin to have the shape of non-woven fabric, etc. The filters are arranged to be superposed. The filters may be selectively applied to the filtering unit as necessary.

When the air cleaning apparatus has been used for a predetermined period of time, the dust collects on the filters as well as the blowing unit. Thus, in order to keep the air cleaning apparatus clean, a user must remove the blowing unit and the filtering unit from the cabinet of the air cleaning apparatus to clean the blowing unit and the filtering unit at regular intervals.

However, the conventional air cleaning apparatus has a problem that a cover of the cabinet must be primarily removed to remove the filtering unit from the air cleaning apparatus. Then the filters must be removed from the cabinet one by one, allowing for an interior of the cabinet to be contaminated by dust collected on the filters while removing the filters from the cabinet. The filters are also complicated to clean or replace. The conventional air cleaning apparatus has another problem in that a blowing fan and a motor are installed in the cabinet. Thus, it is difficult to clean the blowing fan and the motor.

Further, there has been proposed a large-capacity air cleaning apparatus which is provided with a large-capacity filtering unit and a large-capacity blowing fan to clean air in a relatively large room in a short period of time. However, the large-capacity air cleaning apparatus has a problem in that it performs limited functions, so its utility is poor, and it occupies a large space.

SUMMARY OF THE INVENTION

Accordingly, it is an aspect of the present invention to provide an air cleaning apparatus, which is designed such that a filtering unit and a blowing unit are easily installed in or removed from a cabinet of the air cleaning apparatus, thus making it easy to clean the air cleaning apparatus and to replace filters with new filters.

It is another aspect of the present invention to provide an air cleaning apparatus, which is designed such that a cabinet thereof is used as a table.

Additional aspects and advantages of the invention will be set forth in part in the description which follows and, in part, will be obvious from the description, or may be learned by practice of the invention.

The foregoing and/or other aspects of the present invention are achieved by providing an air cleaning apparatus, including a cabinet provided with a top panel of a predetermined area, a blowing unit installed in the cabinet, and a filtering unit installed in the cabinet to remove impurities from air circulated by the blowing unit.

According to an aspect of the invention, the cabinet is opened at a bottom thereof, and is provided on at least one side wall thereof with an air outlet port. The blowing unit includes a fan casing having a rectangular cross-section and being provided on a side wall thereof with an air discharging port to correspond to the air outlet port of the cabinet. The fan casing is installed in the cabinet to be drawn out from the cabinet in a horizontal direction. A blowing fan is installed in the fan casing, and a fan motor is provided to operate the blowing fan.

According to an aspect of the invention, the fan casing is provided on both sidewalls thereof with guide grooves, and the cabinet is provided on inner surfaces of both sidewalls thereof with first guide rails to correspond to the guide grooves. The guide grooves slidably engage with the first guide rails so that the fan casing is drawn out from the cabinet in the horizontal direction.

According to an aspect of the invention, the filtering unit includes a filter casing installed in the cabinet under the blowing unit to be drawn out from the cabinet in a horizontal direction. The filter casing is opened at a top and bottom thereof and has a rectangular cross-section. At least one filter is installed in the filter casing.

According to an aspect of the invention, the filter casing is provided on both sidewalls thereof with guide grooves, and the cabinet is provided on inner surfaces of both sidewalls thereof with second guide rails to correspond to the guide grooves of the filter casing. The guide grooves of the filter casing slidably engage with the second guide rails so that the filter casing is drawn out from the cabinet in the horizontal direction.

According to an aspect of the invention, the filter, installed in the filter casing, includes a free filter mounted at a lower position in the filter casing and having a net structure with large meshes, an electrostatic dust filter superposed on the free filter, and a fine dust filter superposed on the electrostatic dust filter to collect fine dust particles.

The foregoing and/or other aspects of the present invention are achieved by providing an air cleaning apparatus including a fan casing mounted in an upper portion of a cabinet, with a blowing fan installed in the fan casing to circulate air to an air discharging port which is provided on a side wall of the fan casing. The air cleaning apparatus also includes a filter casing mounted under the fan casing and provided with at least one filter, and a guide unit provided between the filter casing and an inner surface of the cabinet to support the filter casing in the cabinet so that the filter casing is drawn out from the cabinet in a horizontal direction.

According to an aspect of the invention, the fan casing is installed in the cabinet so that the fan casing is drawn out from the cabinet in a horizontal direction. The fan casing is exposed at a side thereof to an outside of the cabinet.

According to an aspect of the invention, the air discharging port is provided at the exposed side of the fan casing, discharging clean air to an outside of the cabinet.

According to an aspect of the invention, a control panel is provided at the exposed side of the fan casing to control an operation of the air cleaning apparatus.

According to an aspect of the invention, a first power connecting unit is provided between the fan casing and the inner surface of the cabinet to connect the fan casing to a power source when the fan casing is installed in the cabinet.

According to an aspect of the invention, a second power connecting unit is provided between the filter casing and the inner surface of the cabinet to connect the filter casing to a power source when the filter casing is installed in the cabinet.

According to an aspect of the invention, a bottom of the filter casing is spaced apart from a bottom of the cabinet, allowing air to easily flow into the filter casing.

According to an aspect of the invention, a control panel is mounted to an upper portion of the cabinet, and is provided with a control button to control an operation of the air cleaning apparatus and a display to display an operating state of the air cleaning apparatus.

BRIEF DESCRIPTION OF THE DRAWINGS

The above and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
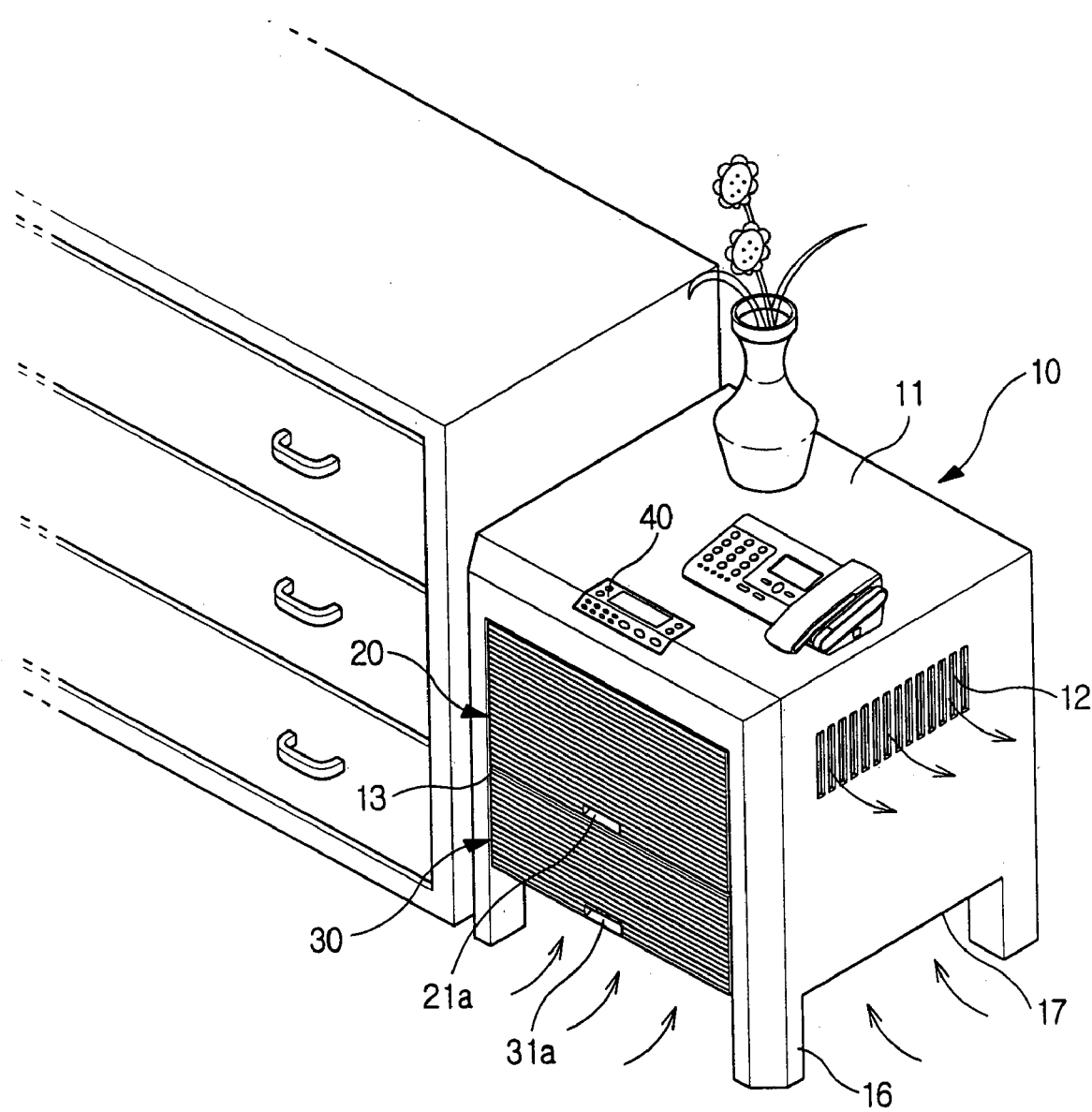
FIG. 1 is a perspective view of an air cleaning apparatus, according to an embodiment of the present invention, when the air cleaning apparatus is installed in a room.

Reference will now be made in detail to the present preferred embodiments of the present invention, examples of which are illustrated in the accompanying drawings, wherein like reference numerals refer to like elements throughout.

Figure 2:
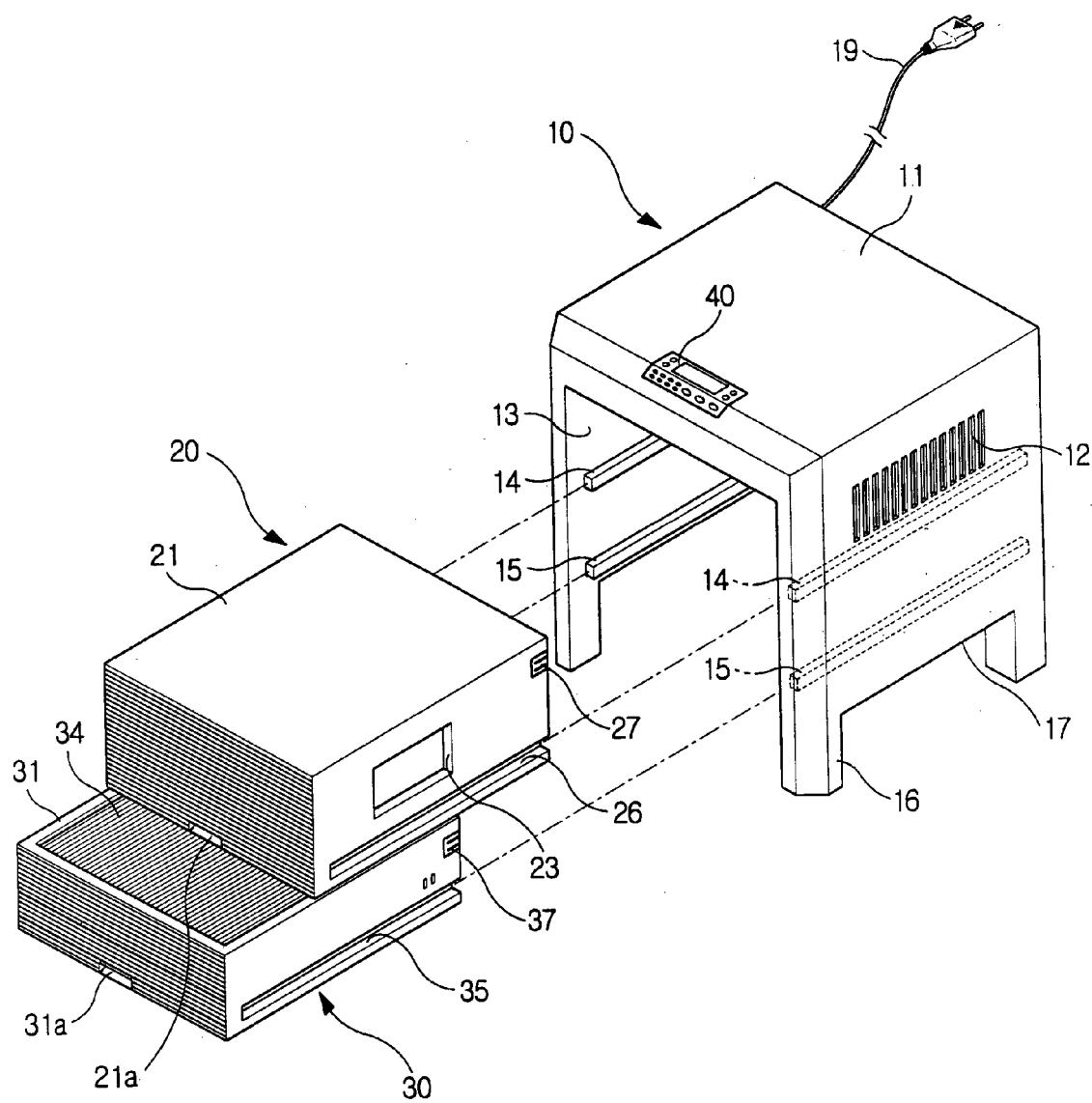
FIG. 2 is a perspective view of the air cleaning apparatus of FIG. 1 when a blowing unit and a filtering unit are removed from a cabinet of the air cleaning apparatus.

As illustrated in FIGS. 1 and 2, an air cleaning apparatus according to an embodiment of the present invention includes a cabinet 10. The cabinet 10 is provided with a flat top panel 11 of a predetermined area so that items, such as a telephone and a vase, are put on the top panel 11. The cabinet 10 has a rectangular box shape which is opened at a side and a bottom thereof. The cabinet is provided on at least one side wall thereof with an air outlet port 12.

A blowing unit 20 is installed in the cabinet 10 at a position to correspond to the air outlet port 12 to circulate room air. A filtering unit 30 is installed under the blowing unit 20 to remove impurities from the air which is circulated by the blowing unit 20. In this case, the blowing unit 20 and the filtering unit 30 are installed in the cabinet 10 to be drawn out from the cabinet 10 in a horizontal direction through an opening 13 which is provided at a side of the cabinet 10, thus allowing the blowing unit 20 and the filtering unit 30 to be easily installed in or removed from the cabinet 10.

Figure 3:
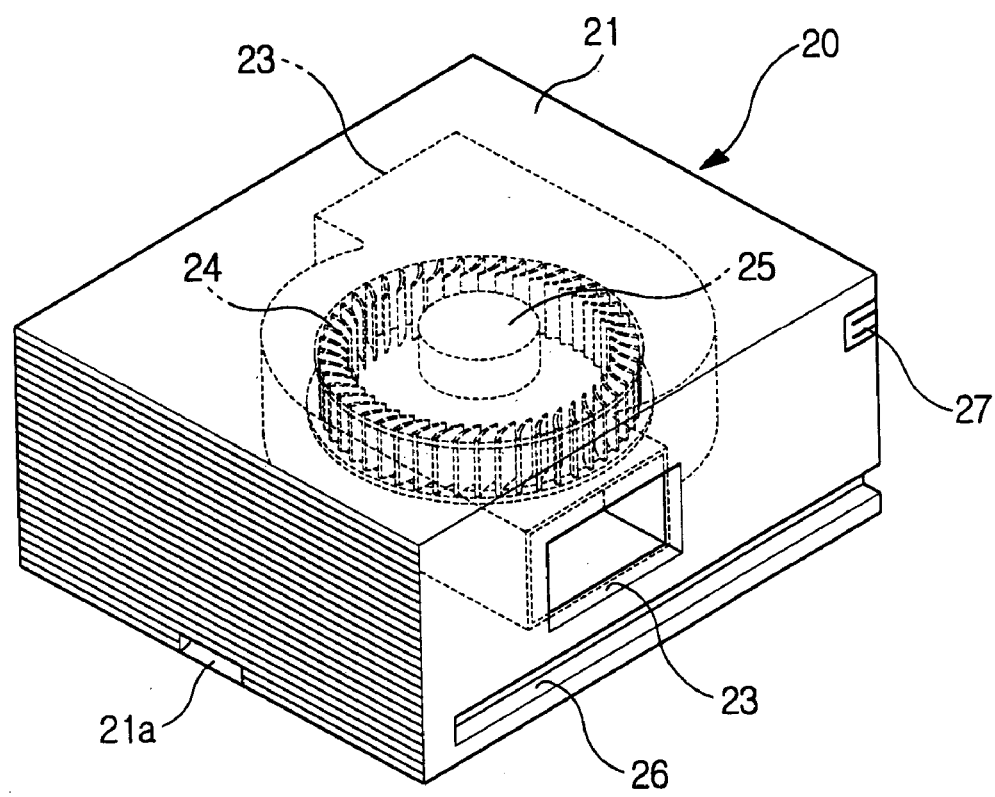
FIG. 3 is a perspective view illustrating the blowing unit included in the air cleaning apparatus of FIG. 1.
Figure 4:
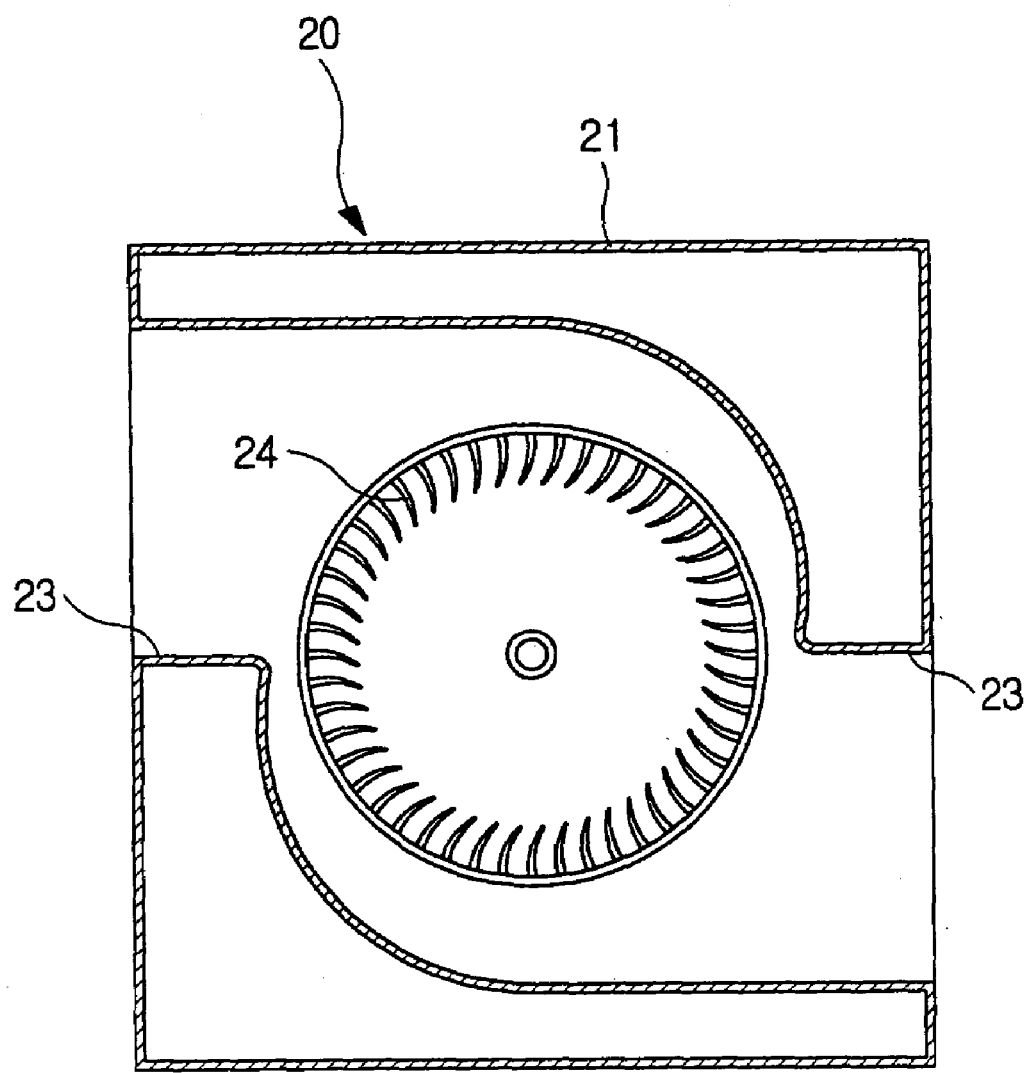
FIG. 4 is a sectional view of the blowing unit included in the air cleaning apparatus of FIG. 1.
Figure 5:
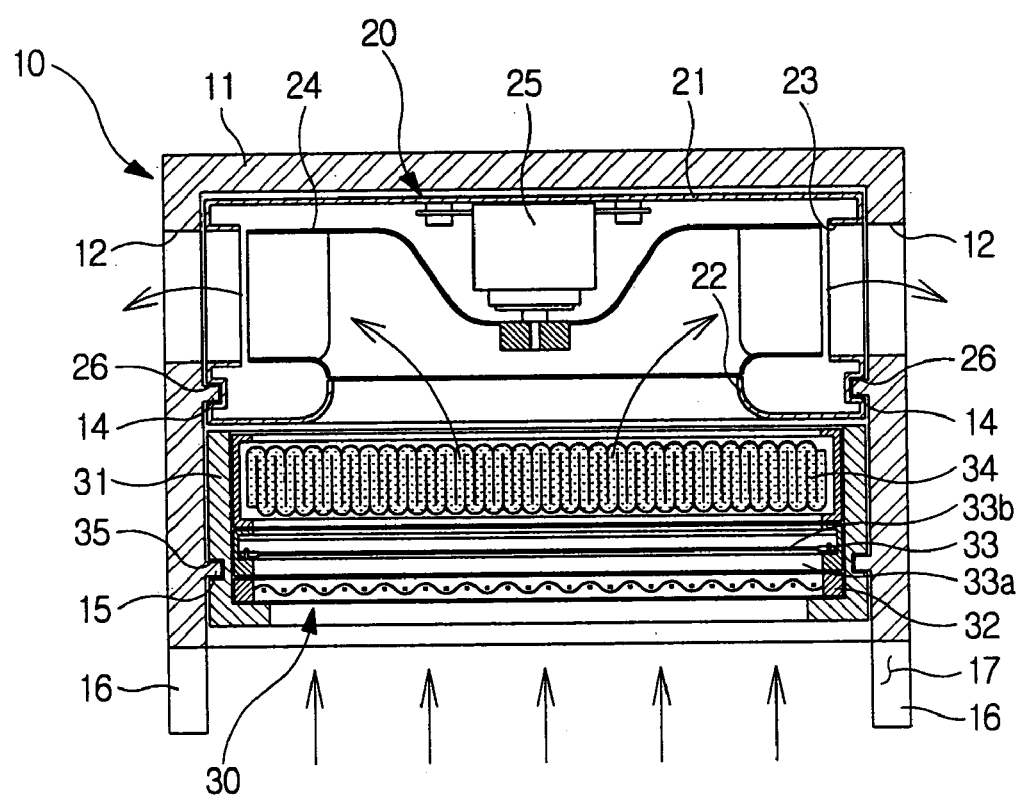
FIG. 5 is a sectional view of the air cleaning apparatus of FIG. 1.

As illustrated in FIGS. 3 through 5, the blowing unit 20 includes a fan casing 21, a blowing fan 24, and a fan motor 25. The fan casing 21 has a rectangular box shape, and is opened at a bottom to have an air guide opening 22 (see, FIG. 5). An air discharging port 23 is provided on a side wall of the fan casing 21 to correspond to the air outlet port 12 of the cabinet 10. The blowing fan 24 is rotatably installed at a center in the fan casing 21, and includes a Sirocco centrifugal fan. The fan motor 25 is mounted to an upper surface of the fan casing 21 to drive the blowing fan 24.

The blowing unit 20 is operated as follows.

When the blowing fan 24 is operated, air is sucked from the bottom of the fan casing 21, and the air is discharged through the air discharging port 23 provided on the side wall of the fan casing 21 to the atmosphere.

The fan casing 21 is provided on both sidewalls thereof with guide grooves 26. The cabinet 10 is provided on inner surfaces of both sidewalls thereof with first guide rails 14. In this case, the guide grooves 26 of the fan casing 21 slidably engage with the first guide rails 14 of the cabinet 10 so that the fan casing 21 is drawn out from the cabinet 10 in the horizontal direction. Such a construction allows the blowing unit 20 to be removed from the cabinet 10 by pulling the blowing unit 20 out from the cabinet 10. The construction also allows the blowing unit 20 to be installed in the cabinet 10 by pushing the blowing unit 20 in the cabinet 10. Thus, the blowing unit 20 is easily removed from and installed in the cabinet 10.

Figure 6:
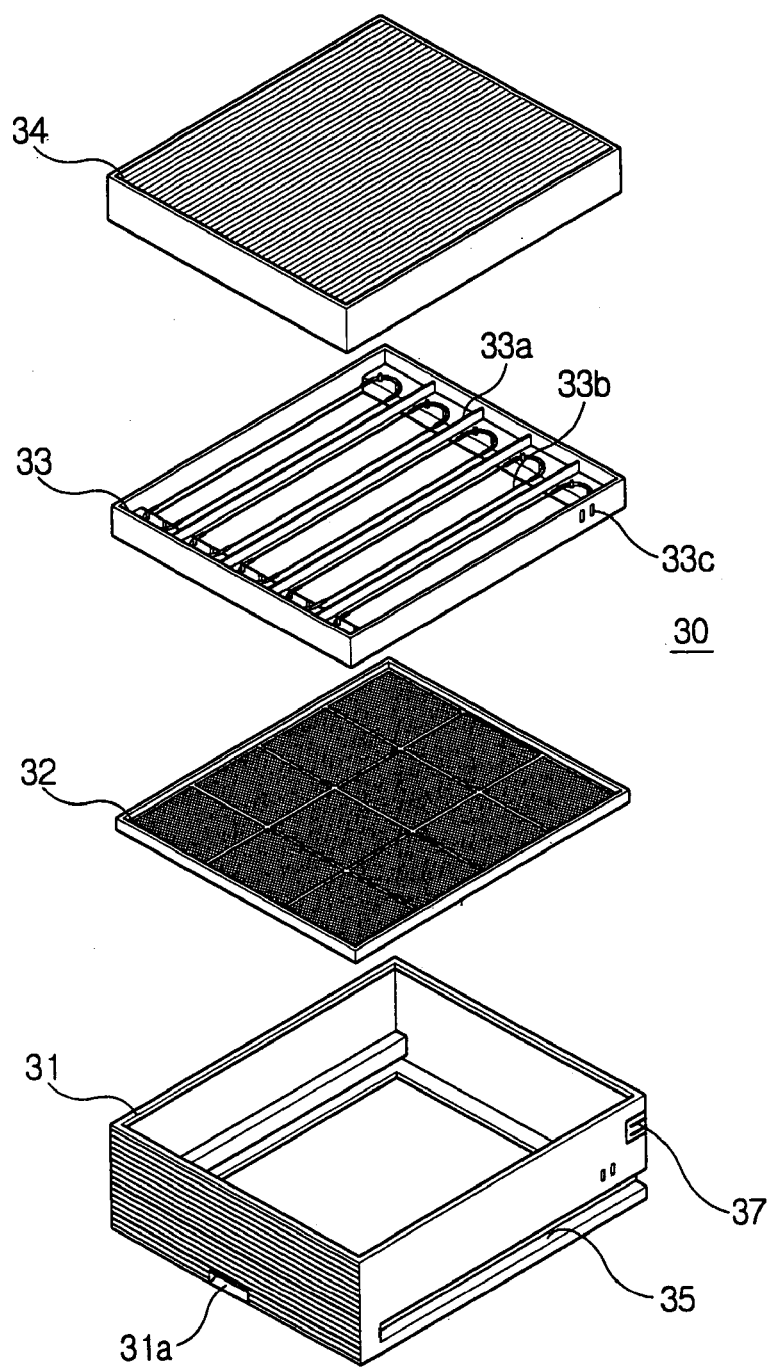
FIG. 6 is an exploded perspective view illustrating the filtering unit included in the air cleaning apparatus of FIG. 1.

As illustrated in FIGS. 5 and 6, the filtering unit 30 includes a filter casing 31, and a plurality of filters 32, 33, 34. The filter casing 31 has a box shape which is opened at bottom and top thereof to allow air to be circulated, and has a width to correspond to the fan casing 21. The filters 32, 33, and 34 are installed in the filter casing 31 to be superposed in a vertical direction. In the same manner as the fan casing 21 of the blowing unit 20, the filter casing 31 is provided on both sidewalls thereof with guide grooves 35. The cabinet 10 is provided on inner surfaces of both sidewalls thereof with second guide rails 15. The guide grooves 35 of the filter casing 31 slidably engage with the second guide rails 15 of the cabinet 10 so that the filtering unit 30 is removed from or installed in the cabinet 10 through its opening 13. In this case, the filter casing 31 is installed in the cabinet 10 so that the bottom of the filter casing 31 is spaced apart from the bottom of the cabinet 10 by a predetermined interval, thus allowing air to easily flow into the filter casing 31. Preferably, the cabinet 10 is opened at its bottom to provide an opening 17, except for a portion of the cabinet 10 including support legs 16, thus allowing air around the cabinet 10 to smoothly flow into the filter casing 31 through the opened bottom of the cabinet 10.

The antibacterial free filter 32, the electrostatic dust filter 33, and the fine dust filter 34 are sequentially installed in the filter casing 31. The antibacterial free filter 32 is mounted at a lower position in the filter casing 31, and has a net structure with relatively large meshes to filter relatively large dust particles. The electrostatic dust filter 33 is superposed on the antibacterial free filter 32, and includes a plurality of ground electrodes 33a and discharging lines 33b which are arranged in parallel to each other to collect dust by ionization of the dust particles. The fine dust filter 34 superposed on the electrostatic dust filter 33, is made of polypropylene resin or polyethylene resin to have a shape of a non-woven fabric, and functions to collect the fine dust.

When the room air is circulated by an operation of the blowing fan 24, the air is cleaned while sequentially passing through the filters 32, 33, and 34. Next, the clean air flows into the blowing unit 20. Meanwhile, when a user desires to remove the filtering unit 30 from the cabinet 10 so as to clean the filtering unit 30 or replace the filters 32, 33, and 34, the user has only to pull the filter casing 31 out from the cabinet 10 in the same manner, for example, as a drawer, thus allowing the filters 32, 33, and 34 to be easily cleaned or replaced with new filters.

As illustrated in FIG. 2, a power cord 19 is connected to the cabinet 10 to supply an external power source to the air cleaning apparatus. The fan casing 21 is provided on its outer surface with a power connecting unit 27 so that the fan casing 21 is connected to or disconnected from the external power source when the fan casing 21 is installed in or removed from the cabinet 10. The filter casing 31 is provided on its outer surface with a power connecting unit 37 so that the filter casing 31 is connected to or disconnected from the power source when the filter casing 31 is installed in or removed from the cabinet 10. Although not illustrated in the drawings, the cabinet 10 is provided on its inner surface with power connecting units to correspond to the power connecting units 27 and 37 which are provided on the fan casing 21 and the filter casing 31, respectively. Power applied to the fan casing 21 through the power connecting unit 27, is supplied to the fan motor 25.

As illustrated in FIG. 6, the power applied to the filter casing 31 through the power connecting unit 37, is supplied to the electrostatic dust filter 33 through a power connecting unit 33c of the electrostatic dust filter 33. As illustrated in FIG. 1, a control panel 40 is mounted to an upper portion of the cabinet 10, and is provided with a plurality of control buttons to control an operation of the air cleaning apparatus, and a display to display an operating state of the air cleaning apparatus.

Figure 7:
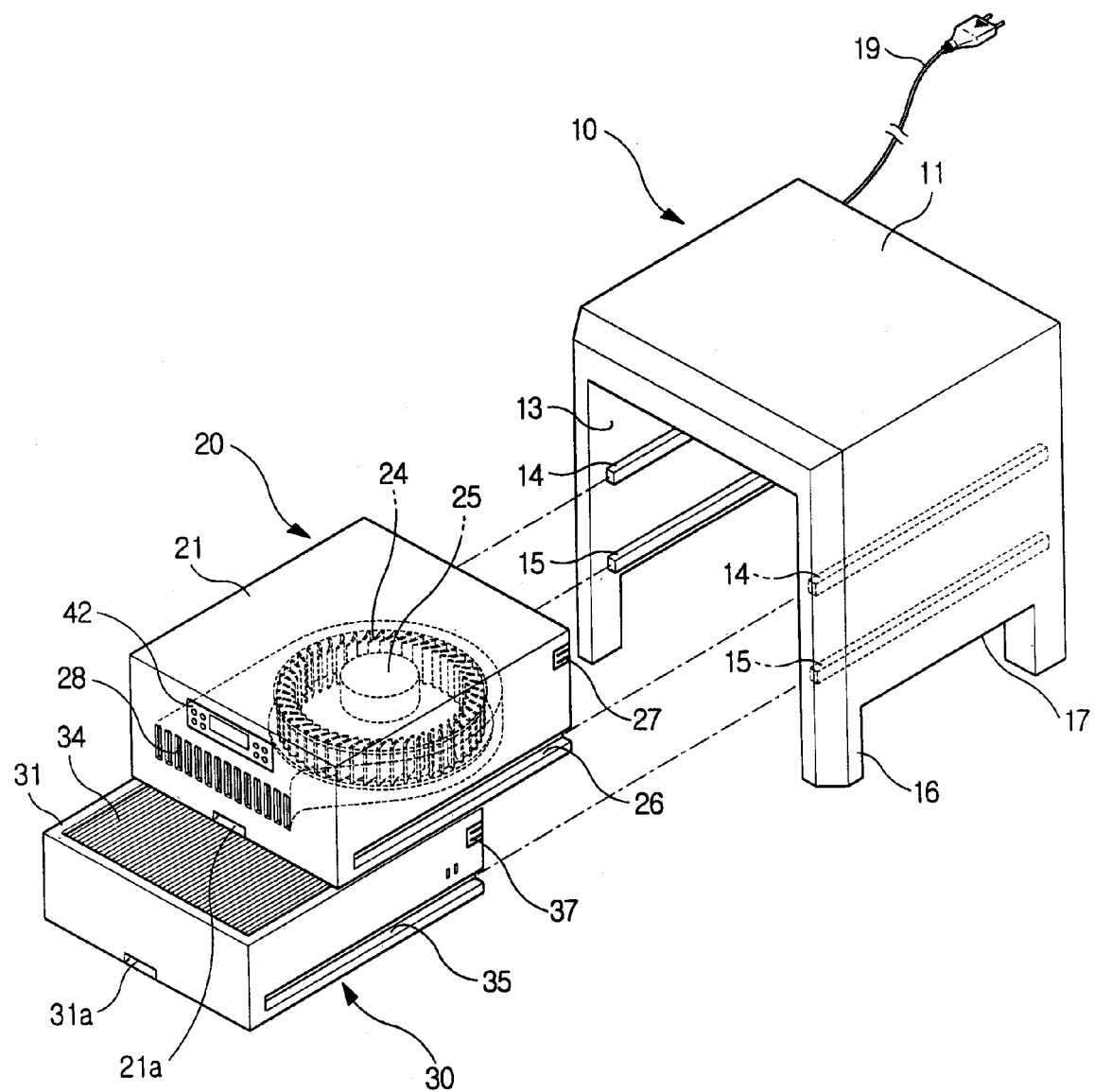
FIG. 7 is a perspective view illustrating an air cleaning apparatus, according to another embodiment of the present invention.

FIG. 7 illustrates an air cleaning apparatus, according to another embodiment of the present invention. In the air cleaning apparatus of FIG. 7, an air outlet port 28 is provided on a front surface of the fan casing 21, and a control panel 42 to control an operation of the air cleaning apparatus is also provided on the front surface of the fan casing 21. The construction of the air cleaning apparatus of FIG. 7 is the same as that of the air cleaning apparatus illustrated in FIGS. 1 through 6, except for the air outlet port 28 and the control panel 42.

An operation and use of the air cleaning apparatus according to the present invention will be described below.

As illustrated in FIG. 1, the air cleaning apparatus is provided with the flat top panel 11, thus allowing items, such as vase or telephone, to be put on the air cleaning apparatus. Further, the air cleaning apparatus may be installed in a living room in such a way as to complement other furniture.

When the user desires to operate the air cleaning apparatus, the control panel 40 or 42 is manipulated to operate the blowing fan 24. As illustrated in FIG. 5, as the blowing fan 24 is operated, air is sucked from the bottom of the cabinet 10, and then passes through the filters 32, 33, and 34 of the filtering unit 30 to be cleaned. Next, the clean air is discharged to a room through the air outlet port 12 or 28, thus cleaning the room air.

After the air cleaning apparatus is operated for a predetermined period of time, as illustrated in FIG. 2, the blowing unit 20 and the filtering unit 30 are removed from the cabinet 10 to clean the air cleaning apparatus or replace the filters 32, 33, and 34 with new filters. The air cleaning apparatus of the present invention is designed such that the fan casing 21 of the blowing unit 20 and the filter casing 31 of the filtering unit 30 are drawn out from the cabinet 10 using handles 21a and 31a which are provided on the fan casing 21 and the filter casing 31, respectively, allowing the blowing unit 20 and the filtering unit 30 to be easily removed from or installed in the cabinet 10. Further, the filtering unit 30 is designed such that the filters 32, 33, and 34 are stacked up in the filter casing 31, allowing the filters 32, 33, and 34 to be easily removed from the filter casing 31, and allowing the filters 32, 33, and 34 to be easily cleaned or replaced with new filters.

As apparent from the above description, the present invention provides an air cleaning apparatus, which is designed such that a blowing unit and a filtering unit are removably installed in a cabinet allowing the blowing unit and the filtering unit to be easily removed from and installed in the cabinet, and allowing the air cleaning apparatus to be easily cleaned.

Further, the present invention provides an air cleaning apparatus, which is designed such that a cabinet is provided with a top panel of a predetermined area, allowing the cabinet to be used as a table.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air cleaning apparatus, comprising:
    a cabinet provided with a top panel of a predetermined area;
    a blowing unit installed in the cabinet; and
    a filtering unit installed in the cabinet to remove impurities from air circulated by the blowing unit,
    wherein the blowing unit and the filtering unit are separately slidably insertable and removable from the cabinet.

2. The air cleaning apparatus according to claim 1, wherein said cabinet is opened at a bottom thereof, and is provided at at least one sidewall thereof with an air outlet port, and
    said blowing unit comprises:
        a fan casing having a rectangular cross-section, and provided on a sidewall thereof with an air discharging port to correspond to the air outlet port of the cabinet, said fan casing being installed in the cabinet to be drawn out from the cabinet in a horizontal direction;
        a blowing fan installed in the fan casing; and
        a fan motor to operate the blowing fan.

3. The air cleaning apparatus according to claim 2, wherein said fan casing is provided on both sidewalls thereof with guide grooves, and
    said cabinet is provided on inner surfaces of both sidewalls thereof with first guide rails to correspond to the guide grooves, whereby said guide grooves slidably engage with the first guide rails so that the fan casing is drawn out from the cabinet in the horizontal direction.

4. The air cleaning apparatus according to claim 1, wherein said filtering unit comprises:
a filter casing installed in the cabinet under the blowing unit to be drawn out from the cabinet in a horizontal direction, said filter casing opened at a top and bottom thereof and having a rectangular cross-section; and
at least one filter installed in the filter casing.

5. The air cleaning apparatus according to claim 4, wherein said filter casing is provided on both sidewalls thereof with guide grooves, and
said cabinet is provided on inner surfaces of both sidewalls thereof with second guide rails to correspond to the guide grooves of the filter casing,
whereby said guide grooves of the filter casing slidably engage with the second guide rails so that the filter casing is drawn out from the cabinet in the horizontal direction.

6. The air cleaning apparatus according to claim 4, wherein said filter, installed in the filter casing, comprises:
a free filter mounted at a lower position in the filter casing and having a net structure with large meshes;
an electrostatic dust filter superposed on the free filter; and
a fine dust filter superposed on the electrostatic dust filter to collect fine dust particles.

7. An air cleaning apparatus, comprising:
a fan casing mounted in an upper portion of a cabinet with a blowing fan installed in the fan casing to circulate air to an air discharging port which is provided on a sidewall of the fan casing;
a filter casing mounted under the fan casing, and provided with at least one filter; and
a guide unit provided between the filter casing and an inner surface of the cabinet to support the filter casing in the cabinet and between the fan casing and the inner surface of the cabinet to support the fan casing in the cabinet, wherein the fan casing and the filter casing are separately slidably removed from the cabinet in a horizontal direction.

8. The air cleaning apparatus according to claim 7, wherein said fan casing is provided on both sidewalls thereof with guide grooves, and
said cabinet is provided on inner surfaces of both sidewalls thereof with guide rails to correspond to the guide grooves,
whereby said guide grooves slidably engage with the guide rails so that the fan casing is slidably removed from the cabinet in the horizontal direction.

9. The air cleaning apparatus according to claim 8, wherein said fan casing is exposed at a side thereof to an outside of the cabinet, allowing the fan casing to be easily removed from the cabinet.

10. The air cleaning apparatus according to claim 9, wherein said air discharging port is provided at the exposed side of the fan casing, discharging clean air to the outside of the cabinet.

11. The air cleaning apparatus according to claim 9, further comprising:
a control panel provided at the exposed side of the fan casing to control an operation of the air cleaning apparatus.

12. The air cleaning apparatus according to claim 8, further comprising:

a first power connecting unit provided between the fan casing and the inner surface of the cabinet to connect the fan casing to a power source when the fan casing is installed in the cabinet.

13. The air cleaning apparatus according to claim 8, further comprising:
an air outlet port provided on at least one of the sidewalls of the cabinet at a position to correspond to the air discharging port of the fan casing.

14. The air cleaning apparatus according to claim 7, wherein said guide unit comprises:
guide grooves and guide rails which are provided on both sidewalls of the filter casing and inner surfaces of both sidewalls of the cabinet, respectively, so that said guide grooves slidably engage with the guide rails.

15. The air cleaning apparatus according to claim 12, further comprising:
a second power connecting unit provided between the filter casing and the inner surface of the cabinet to connect the filter casing to a power source when the filter casing is installed in the cabinet.

16. The air cleaning apparatus according to claim 7, wherein said filter casing is provided at a top and bottom thereof with openings to circulate air, and
said filter, installed in the filter casing, comprises:
a free filter mounted at a lower position in the filter casing and having a net structure with large meshes;
an electrostatic dust filter superposed on the free filter; and
a fine dust filter superposed on the electrostatic dust fitter to collect fine dust particles.

17. The air cleaning apparatus according to claim 7, wherein a bottom of the filter casing is spaced apart from a bottom of the cabinet, allowing air to easily flow into the filter casing.

18. The air cleaning apparatus according to claim 7, further comprising:
a control panel mounted to an upper portion of the cabinet, and provided with a control button to control an operation of the air cleaning apparatus, and a display to display an operating state of the air cleaning apparatus.

19. An air cleaning apparatus, comprising:
a cabinet provided with a flat top panel, and opened at a bottom and a side thereof to provide openings;
a fan casing installed in the cabinet to be slidably removed from the cabinet in a horizontal direction through the opening provided at the side of the cabinet, and provided at a bottom and a side thereof with openings to correspond to the openings of the cabinet, wherein a blowing fan is installed in the fan casing to suck air through the opening provided at the bottom of the fan casing and to discharge the air through the opening provided at the side of the fan casing; and
a filter casing installed under the fan casing to be slidably removed from the cabinet through the opening provided at the side of the cabinet, having a plurality of filters installed therein to be superposed, the fan casing and filter casing being separately slidably removable.

20. The air cleaning apparatus according to claim 19, wherein said blowing fan comprises a Sirocco centrifugal fan which sucks air through the opening provided at the bottom of the fan casing and discharges air through the opening provided at the side of the fan casing.

21. The air cleaning apparatus according to claim 19, wherein a bottom of the filter casing is spaced apart from the bottom of the cabinet by a predetermined interval, allowing air to easily flow into the filter casing.

22. The air cleaning apparatus according to claim 19, wherein the bottom of the cabinet has an opening to allow air around the cabinet to smoothly flow into the filter casing through the opened bottom of the cabinet.

23. The air cleaning apparatus according to claim 19, further comprising:
 a power source to supply power to the air cleaning apparatus;
 a first power connecting unit provided between the fan casing and the cabinet to connect the fan casing to the power source when the fan casing is installed in the cabinet;
 a second power connecting unit provided between the filter casing and the cabinet to connect the filter casing to the power source when the filter casing is installed in the cabinet; and
 a third power connecting unit provided in the cabinet to correspond to the first and second power connecting unit.

24. The air cleaning apparatus according to claim 23, wherein power is applied to the fan casing through the first power connecting unit to operate the blowing fan, allowing the air to be sucked from the bottom of the cabinet, passed through the filters, and discharged through the side of the fan casing.

25. The air cleaning apparatus according to claim 23, wherein power is applied to the filter casing through the second power connecting unit to operate one of the filters.

26. An air cleaning apparatus, comprising:
 a cabinet having an opening at a bottom and a side thereof;
 a blowing unit installed in the cabinet to be slidably inserted in and removed from the cabinet through the side opening of the cabinet, and provided with an opening at a bottom and side thereof to correspond to the bottom and side opening of the cabinet; and
 a filtering unit installed under the blowing unit to be slidably inserted in and removed from the cabinet through the side opening of the cabinet; and
 wherein the blowing unit and fan unit is separately slidably inserted in and removed from the cabinet.

27. The air cleaning apparatus according to claim 26, wherein the cabinet is provided with an air outlet port on sidewalls thereof.

28. The air cleaning apparatus according to claim 27, wherein the blowing unit comprises:
 a fan casing having an air discharging port to correspond to the air outlet port of the cabinet;
 a blowing fan installed in the fan casing; and
 a fan motor to operate the blowing fan.

29. The air cleaning apparatus according to claim 28, further comprising:
 first guide grooves provided on sidewalls of the fan casing;
 first guide rails provided on the sidewalls of the cabinet to correspond to the guide grooves, whereby the first guide grooves slidably engage with the first guide rails so that the blowing unit is slidably inserted in and removed from the cabinet.

30. The air cleaning apparatus according to claim 26, wherein said filtering unit comprises:
 a filter casing;
 a plurality of filters installed in the filter casing.

31. The air cleaning apparatus according to claim 30, further comprising:
 second guide grooves proved on sidewalls of the filter casing; and
 second guide rails provided on the sidewalls of the cabinet to correspond to second guide grooves of the filter casing, whereby the second guide grooves of the filter casing slidably engage with the second guide rails so that the filtering unit is slidably insertably inserted in and removed from the cabinet.

32. An air cleaning apparatus having a cabinet, comprising:
 a blowing unit installed in the cabinet; and
 a filtering unit installed in the cabinet to remove impurities from air circulated by the blowing unit,
 wherein the blowing unit and the filtering unit are separately slidably insertable and removable from the cabinet.

* * * * *

UNITED STATES PATENT AND TRADEMARK OFFICE
CERTIFICATE OF CORRECTION

PATENT NO. : 7,112,232 B2 Page 1 of 1
APPLICATION NO. : 10/673129
DATED : September 26, 2006
INVENTOR(S) : Jun Eui Chang et al.

It is certified that error appears in the above-identified patent and that said Letters Patent is hereby corrected as shown below:

Title Page, Item (57) (Abstract), Line 7, change "side wall" to --sidewall--.

Column 8, Line 31, change "fitter" to --filter--.

Column 10, Line 31, after "slidably" delete "insertably".

Signed and Sealed this

Twentieth Day of February, 2007

JON W. DUDAS
*Director of the United States Patent and Trademark Office*